United States Patent
Kraehenbuehl et al.

(10) Patent No.: US 11,717,778 B2
(45) Date of Patent: Aug. 8, 2023

(54) DEVICE FOR THE PRECIPITATION OF PARTICLES FROM A GAS STREAM

(71) Applicant: WOCO Industrietechnik GmbH, Bad Soden-Salmünster (DE)

(72) Inventors: David Kraehenbuehl, Hattenhof (DE); Sebastian Fenske, Rodgau (DE); Uwe Ludwig, Bad Soden-Salmünster (DE)

(73) Assignee: WOCO Industrietechnik GmbH, Bad Soden-Salmünster (DE)

(*) Notice: Subject to any disclaimer, the term of this patent is extended or adjusted under 35 U.S.C. 154(b) by 0 days.

(21) Appl. No.: 15/575,261

(22) PCT Filed: May 12, 2016

(86) PCT No.: PCT/EP2016/060637
§ 371 (c)(1),
(2) Date: Nov. 17, 2017

(87) PCT Pub. No.: WO2016/184768
PCT Pub. Date: Nov. 24, 2016

(65) Prior Publication Data
US 2018/0133633 A1    May 17, 2018

(30) Foreign Application Priority Data

May 19, 2015    (DE) .......................... 202015102560.2

(51) Int. Cl.
*B01D 45/06*    (2006.01)
(52) U.S. Cl.
CPC .................. *B01D 45/06* (2013.01)

(58) Field of Classification Search
CPC ........ B01D 45/06; B01D 45/16; B01D 45/08; B01D 50/002; F01M 13/04; F01M 2013/0072
See application file for complete search history.

(56) References Cited

U.S. PATENT DOCUMENTS 1,901,370 A * 3/1933 Kuhner .................. F23J 15/027
                                                          55/392.1
3,077,714 A * 2/1963 McLivaine ............ B01D 45/10
                                                             96/311
(Continued)

FOREIGN PATENT DOCUMENTS

DE    102004010583    10/2005
DE    202007003292    8/2008
(Continued)

OTHER PUBLICATIONS

International Search Report and Written Opinion dated Aug. 3, 2016 for PCT/EP2016/060637.
(Continued)

*Primary Examiner* — Dung H Bui
(74) *Attorney, Agent, or Firm* — Banner & Witcoff Ltd.

(57) ABSTRACT

The invention relates to a device for precipitating liquid and/or particulate impurities from a gas stream, comprising at least one first guiding element and at least one second guiding element, it being possible to impose at least one first change in direction on the gas stream by means of said first guiding element, and to impose at least one second change in direction on the gas stream by means of the second guiding element, the fluid stream additionally flowing in a substantially laminar manner along the first guiding element and the second guiding element.

20 Claims, 3 Drawing Sheets

(56) References Cited

U.S. PATENT DOCUMENTS

| | | | |
|---|---|---|---|
| 4,263,027 A | | 4/1981 | Varnas et al. |
| 4,545,792 A | * | 10/1985 | Huttlin .................. B01D 45/06 96/320 |
| 4,830,644 A | * | 5/1989 | Gutermuth ............. B01D 45/06 24/545 |
| 5,342,422 A | * | 8/1994 | Wimbock .............. B01D 45/08 55/444 |
| 7,166,140 B2 | * | 1/2007 | Entezarian ............. B01D 45/08 55/320 |
| 7,585,345 B2 | * | 9/2009 | Smasal .................. B01D 45/08 55/443 |
| 7,947,123 B2 | * | 5/2011 | Kwok ................. F24C 15/2035 126/299 C |
| 9,724,624 B1 | * | 8/2017 | Walker ................ B01D 50/002 |
| 2002/0189213 A1 | * | 12/2002 | Neuschwander ...... B01D 45/08 55/385.3 |
| 2005/0028498 A1 | * | 2/2005 | Entezarian ........... B01D 50/002 55/320 |
| 2006/0157048 A1 | * | 7/2006 | Heilman ............. F24C 15/2035 126/299 R |
| 2009/0019822 A1 | * | 1/2009 | Feisthammel ...... F24C 15/2035 55/385.4 |
| 2010/0126479 A1 | | 5/2010 | Shieh et al. |
| 2011/0030629 A1 | * | 2/2011 | Schleiden ................. B04C 3/04 123/41.86 |
| 2011/0139010 A1 | * | 6/2011 | Sattler-Laegel ....... B01D 45/16 96/156 |
| 2012/0079946 A1 | * | 4/2012 | Dold ...................... B01D 45/08 96/425 |
| 2013/0133639 A1 | * | 5/2013 | Lee .................... F24C 15/2035 126/299 D |
| 2014/0007770 A1 | * | 1/2014 | Gaebler ............... B01D 50/002 95/272 |
| 2014/0157737 A1 | * | 6/2014 | Schleiden .............. F01M 13/04 55/464 |
| 2014/0345461 A1 | * | 11/2014 | Sikkenga ............... B01D 45/16 95/272 |
| 2015/0101588 A1 | * | 4/2015 | Yoon ..................... B01D 45/08 126/299 D |
| 2015/0343355 A1 | * | 12/2015 | Lucas .................. B01D 50/002 55/443 |
| 2015/0362196 A1 | * | 12/2015 | Chen .................. F24C 15/2035 55/437 |
| 2016/0047342 A1 | * | 2/2016 | Kraxner ............. F02M 35/0223 55/442 |
| 2016/0175750 A1 | * | 6/2016 | Padovan ................ F22B 37/30 55/440 |
| 2016/0288035 A1 | * | 10/2016 | Pereira .................. B01D 45/08 |

FOREIGN PATENT DOCUMENTS

| | | | | |
|---|---|---|---|---|
| EP | | 1262223 | 4/2002 | |
| WO | WO 2003/072222 | | 9/2003 | |
| WO | WO-2009106804 A2 | * | 9/2009 | ............ B01D 45/06 |

OTHER PUBLICATIONS

Preliminary Report on Patentability dated Sep. 26, 2017 for PCT/EP2016/060637.

* cited by examiner

DEVICE FOR THE PRECIPITATION OF PARTICLES FROM A GAS STREAM

CROSS REFERENCE TO RELATED APPLICATIONS

This application is the National Phase application of International Application No. PCT/EP2016/060637, filed May 12, 2016, which designates the United States and was published in English, and claims priority to German Application No. DE202015102560.2, filed May 19, 2015. These applications, in their entirety, are incorporated herein by reference.

BACKGROUND

Field

The invention relates to a device for precipitating liquid and/or particulate impurities from a gas stream, comprising at least one first guiding element and at least one second guiding element, it being possible to impose at least one first change in direction on the gas stream by means of said first guiding element and to impose at least one second change in direction on the gas stream by means of the second guiding element.

Related Art

From the prior art, various precipitation devices for precipitation of liquid and/or particulate impurities from a gas stream are known, in particular a blow-by-gas stream of a combustion machine, in particular a motor-powered vehicle.

For example, a gas stream discharged from a crankcase contains both solid and liquid particles, in particular oil droplets. To reduce the environmental impact and/or to avoid that oil-laden gas stream is introduced into the air intake tract of the combustion machine, various precipitators are used to remove these particulates from the gas stream.

For example, DE102004010583B4 discloses an oil precipitator for precipitation of oil from a fluid stream. A labyrinthine stream opening is suggested for precipitation of the oil, with baffle walls, being at least partly rubber-like and deformable, being arranged in the stream path.

With such baffle walls, the fluid stream generally impinges upon the baffle wall in a vertical manner, i.e. along a normal direction of the surface of the baffle wall, which results in the liquid or solid particles impinging upon the baffle wall due to the inertia of such particles contained in the fluid stream while the rest of the fluid stream laterally streams off the impact surface.

The disadvantage with this type of oil separator is that the dynamic pressure generated in the fluid stream is relatively high so that the separator generates a comparatively high flow resistance for the fluid or gas stream.

Moreover, known from the prior art are cyclone precipitators. For example, DE202007003292U1 discloses an oil precipitator with at least one cyclone. The oil precipitator includes a gas inlet to be connected with the crankcase of the combustion machine and a gas outlet to be connected with the air intake tract of the combustion machine. The crankcase ventilation gas enters an inside space of the cyclone at the gas inlet and there it is transferred to a rotary stream. As a consequence of the centrifugal forces, the entrained oil droplets are transported to the outside and precipitate at the inner wall of the cyclone. From there, the oil flows down into an oil drain.

However, the disadvantage with these precipitators is that they require a relatively large installation space. Oftentimes, this space is not available inside an engine compartment of a motor-powered vehicle.

DETAILED DESCRIPTION

Therefore, the object of the present invention is to provide a device for precipitation of liquid and/or gaseous particles from a fluid stream, in particular a gas stream, that overcomes the disadvantages of the prior art and in particular ensures compact design and at the same time lowest-possible flow resistance for the fluid stream.

This object is achieved according to the invention in that the fluid stream generally flows along the first guiding element and the second guiding element in a laminar fashion.

The invented device may be characterized by at least a third guiding element, preferably a number of several third guiding elements, with the third guiding elements imposing at least one change in direction of the fluid stream and the fluid stream flowing laminarly along the third guiding element, preferably with a change in direction of flow being imposed to the fluid stream by every third guiding element differing from the direction imposed by the previous third guiding element.

Moreover, the invention for the device suggests that the fluid stream (F, F', GS, GS') generally enters the device along a first direction (R1 direction, X direction in FIG. 2); that the first change in direction causes the fluid stream to generally emerge from the first guiding element in a second direction (R2 direction); that the second change in direction causes the fluid stream to generally emerge from the second guiding element in a third direction (R3 direction); and/or that the third change in direction causes the fluid stream to generally emerge from the third guiding element in a fourth direction, preferably at least from a first third guiding element in a first fourth direction and from a second third guiding element in a second fourth direction.

It is particularly preferred that the first direction and the second direction, the second direction and the third direction, and/or the first third direction and the second third direction are oriented relative to one another at an angle between 90° and 180°, that they particularly run opposingly parallel, and/or that the fluid stream emerges from the device along an outlet direction, particularly the third direction, fourth direction, and/or the second fourth direction, with the outlet direction preferably being parallel with the first direction.

In addition, this invention suggests that the fluid stream during the first change in direction, during the second change in direction, and/or during the third change in direction is set in rotational, swirling, and/or spinning motion.

Advantageous embodiments of the invention may be characterized in that the first guiding element provides at least one first guiding surface and the second guiding element provides at least one second guiding surface, and/or the third guiding element provides at least one third guiding surface.

With the embodiment specified above, it is particularly preferred for the fluid stream to generally enter the first guiding element tangentially to the first guiding surface, the second guiding element tangentially to the second guiding surface, and/or the third guiding element tangentially to the third guiding surface.

With the two embodiments specified above, it is particularly preferred that the first guiding surface, the second guiding surface, and/or the third guiding surface has a spherical, elliptic, and/or arched cross section, at least in parts; however, preferably at least the cross section comprises or comprise of a circular cylinder, a parabolic cylinder, an elliptic cylinder, and/or an arched surface.

Particularly advantageous embodiments of the invention provide that the first guiding surface comprises at least one first, at least partial, bending radius, that the second guiding surface comprises at least one second, at least partial, bending radius, and/or that the third guiding surface comprises at least one third, at least partial, bending radius; preferably with the first bending radius being equal to the second bending radius and/or equal to the third bending radius; the first bending radius being larger than the second bending radius, the second bending radius being larger than the third bending radius, and/or the first bending radius being larger than the third bending radius; or the first bending radius being smaller than the second bending radius, the second bending radius being smaller than the third bending radius, and/or the first bending radius being smaller than the third bending radius.

The invention further suggests for the fluid stream to flow in a labyrinthine or meandering fashion by means of the first guiding element, the second guiding element, and/or the third guiding element, particularly in a plane that is generally perpendicular to the first direction.

A device according to the invention may further be characterized by at least one guiding facility, preferably enclosed by the second guiding element and particularly located on a side facing away from the second guiding element, with the fluid stream being forced into the first direction by this guiding facility.

It is particularly preferred that the first guiding element, the second guiding element and/or the third guiding element is/are generally positioned in the first plane.

The invention further suggests that a device according to the invention, characterized by at least one support frame, preferably arranged in the first plane, with the first guiding element, the second guiding element, and/or the third guiding element is/are at least indirectly borne by the support frame.

For the embodiment specified above, it is particularly preferred that the first guiding element, the second guiding element, and/or the third guiding element, particularly the first third guiding element and/or the second third guiding element, is/are movably mounted relative to the support frame, in particular against at least one restoring force established by at least one resetting device preferably manufactured, at least partially, as one piece together with the first guiding element, the second guiding element or the third guiding element; preferably with the first guiding element being movable relative to the second guiding element, the third guiding element relative to the second guiding element, and/or the second third guiding element relative to the first third guiding element.

The inventors further suggest with this invention that the resetting device comprises at least one spring element, preferably a leaf spring, helical spring, and/or elastomer spring.

A precipitation device according to the invention may also be characterized in that there is a gap between the first guiding element and the second guiding element, between the third guiding element and the second guiding element, and/or between the second third guiding element and the first third guiding element, preferably modifiable depending on a flow parameter of the gas stream, such as a type of dynamic pressure, a type of static pressure, a flow quantity, and/or a flow speed, with a minimum, greater than zero, gap between the first guiding element and the second guiding element, the third guiding element and the second guiding element, and/or preferably the second third guiding element and the first third guiding element being maintained.

It is particularly preferred for the first guiding element to at least partially extend into the second guiding element, the second guiding element to at least partially extend into the first guiding element, the second guiding element to at least partially extend into the third guiding element, the third guiding element to at least partially extend into the second guiding element, the first third guiding element to at least partially extend into the second third guiding element, and/or the second third guiding element to at least partially extend into the first third guiding element.

Particularly advantageous embodiments may be characterized by a multiple number of first guiding elements, second guiding elements and/or third guiding elements being arranged in several planes, with preferably at least two first guiding elements, two second guiding elements, and/or two third guiding elements being at least partially manufactured as one piece and particularly providing a W-shaped cross section.

Finally, it is suggested for the device according to the invention that the support frame, the first guiding element, the second guiding element, and/or the third guiding element comprise plastic material, at least in parts, particularly injection-molded parts, and/or that the first guiding element, the second guiding element, the third guiding element, and/or the resetting device comprise(s) at least one metal, preferably sheet metal, preferably in the form of at least one punched metal sheet part.

Consequently, the invention is based on the surprising discovery that through appropriate shaping of the respective guiding elements within a precipitator labyrinthian flow guidance for a fluid stream, particularly a gas stream, may be provided to achieve best possible precipitation of particles from the fluid stream, and at the same time to avoid unnecessary increase of the flow resistance for the fluid stream.

To that effect it is suggested for the fluid stream to be guided such that it generally flows in a laminar fashion along a surface of guiding elements, so that the formation of vortices and turbulences that would result in an increase of flow resistance and dynamic pressure is avoided. At the same time, a high degree of efficiency is achieved for the device acting as passive precipitator, i.e. the precipitator does not require additional driving power due to the fluid stream being set to rotational or spinning motion so that the particles are precipitated from the fluid stream due to centrifugal forces.

Consequently, the positive properties of a cyclone are exploited, however without the need to increase the installation space. Moreover, the fluid stream is deflected several times so that a generally labyrinthian or meandering motion of the fluid stream takes place in one plane and a high degree of precipitation is achieved due to multiple deflection. Basically, an initial severe deflection is appropriate for achieving a sufficiently high degree in precipitation. Due to the small radius in combination with a high flow speed, particularly high centrifugal forces are reached, which are capable of precipitating even the smallest particles. "Multiple deflection" or the second deflection is only required for guiding the flow into the intended final direction, for example, so that the third flow direction (R3 in FIG. 2) is roughly the same as the first flow direction (R1 in FIG. 2). In other words, particle precipitation takes place due to centrifugal forces, with separation of the fluid stream, the acceleration and deflection that cause rotational motion of the stream, achieving a high degree of efficiency.

Due to deflection of the fluid stream, particularly by mainly tangential impact of the stream on the surface of the separation element, the fluid stream follows the bent surface contour (sectionally-spherical guiding surface) of the precipitator or the guiding element (i.e. deflector), similar to an intake area of the cyclone and a subsequent deflection via a partial circumference, for example a first half-circle deflection in a cyclone. By using a large number of first and second guiding elements (e.g. deflectors), the fluid stream is separated into a large number of deflection areas, with the number of guiding elements and their respective radii being adjusted to the design volume of the respective combustion machine. Consequently, a first guiding element causes deflection of the fluid stream from a first direction (R1) to a second direction (R2), in particular, a direction that is opposingly parallel to the first direction (R1). By means of a counter-contour that is manufactured in the form of a second guiding element, a second change in direction (R3) is then induced in the fluid stream, particularly in such a fashion that the fluid stream exits the second guiding element and thus the precipitator after one deflection, which sets the fluid stream in rotational motion, in a direction (R3) that is generally parallel and with the same orientation as the first direction (R1).

The number of provided guiding elements may be increased further, in particular, one or more third elements may be provided, which the fluid stream enters after exiting the second guiding element and where it is deflected once or several times. It is particularly preferred for each of the guiding elements to cause deflection of the fluid stream by 180° so that the fluid stream performs a half-circle arch movement within every guiding element. In this way, the greatest possible centrifugal force is built up in the fluid stream and at the same time, the lowest possible installation height is achieved for the precipitator. This design also ensures labyrinthian or meandering movement guidance of the fluid stream along one plane that is perpendicular to the inlet direction of the fluid stream into the device and the stream exiting the precipitator in the same direction as the inlet direction. Due to a large number of first, second, and third guiding elements being installed next to one another, particularly along the plane described above, sufficient volumetric throughput can be ensured in the precipitator, and particularly build-up of increased dynamic pressure can be prevented in the fluid stream.

Figure 2:
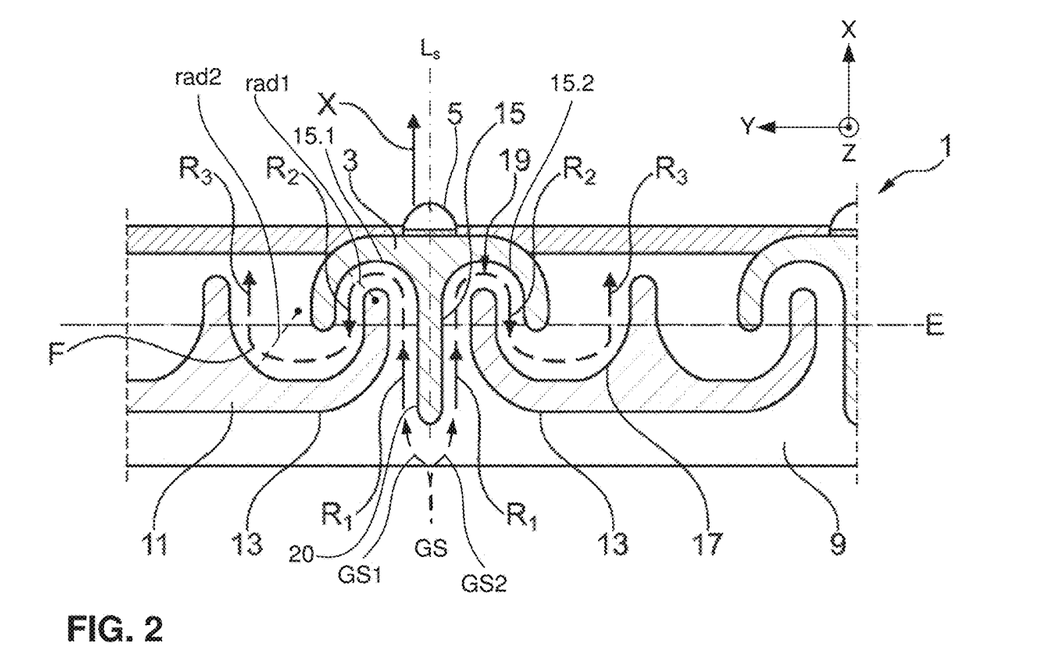
FIG. 2 Schematic cross section view of the precipitation device as illustrated in FIG. 1, as seen from direction A of FIG. 1.

The respective guiding elements may be of different surface shapes. They may be circular or spherical, but also elliptic, parabolic or similar. In this way, greatest possible laminarity of the stream can be achieved and at the same time largest possible centrifugal forces are induced in the fluid stream. The bending radii of the individual guiding elements may differ (e.g. rad2>rad1 as shown in FIG. 2) so that a consistent degree of precipitation can be ensured for every deflection, with the bending radius being incrementally reduced from one guiding element to the next. In this way, the largest particles can be precipitated during the first deflection in the first guiding element since this requires the lowest centrifugal forces. With increasing number of deflections, the bending radius may be reduced so that higher centrifugal forces are generated in the fluid stream so that effacing precipitation is also possible for smaller particles. Alternatively, the bending radius may be increased from one guiding element to another. This ensures precipitation of larger particles that have formed from smaller particles in the previous deflections. In this scenario, both the small and the large particles are precipitated right at the first severe deflection. The particles precipitated at the first severe deflection, for instance small and large oil particles, may precipitate in the form of a film along the guiding surfaces and may be entrained with the stream due to high streaming speeds so that at the end of the guiding surface they are carried away in the form of large particles, such as oil drops. However, these large particles are precipitated already by low centrifugal forces as they are induced in the subsequent deflections (lower centrifugal forces caused by larger cross sections, thus lower flow speeds and larger bending radii). From here, the precipitated particles may be drained in the areas with lower flow speeds.

The guiding elements preferably extend into one another, at least in parts, so that smooth transition of the fluid stream from one guiding element to the subsequent guiding element is achieved, in particular best possible laminarity of the gas stream is ensured.

The entire device may be built as one piece, in particular, the respective guiding elements mounted on a support frame may be built as single pieces. This particularly makes it possible for the device to be manufactured as favorably priced injection-molded plastic part. Moreover, it may also be designed such that the precipitation device provides a variable geometry. In this it is particularly preferred for the respective guiding elements to be alternately fixed at the support frame or movable relative to the support frame. For example, the first guiding element may be movable relative to the support frame, while the counter-contour or the second guiding element is fixed relative to the support frame. In this it is preferred for the movability of the first guiding element to be established against a resetting device, particularly a spring element, for example a leaf spring element that is manufactured as one piece together with the guiding element. This ensures that the flow cross section may be enlarged depending on the magnitude of the volumetric flow. In this way additional build-up of increased dynamic pressure in the fluid stream is prevented.

Consequently, the invention provides the advantage of providing a precipitation device that can be manufactured at low cost, provides a compact structure, can be used in a flexible manner, particularly adjusted to various framework conditions with minimum effort, and is capable of integration into a bypass function. For example, it is possible for a bypass opening to be integrated within the support frame and to be opened or closed, particularly by means of a control bypass valve, through which the fluid stream can be either fully or in parts guided from the inlet area towards the outlet area of the separator in partly bypassing the guiding elements.

Figure 1:
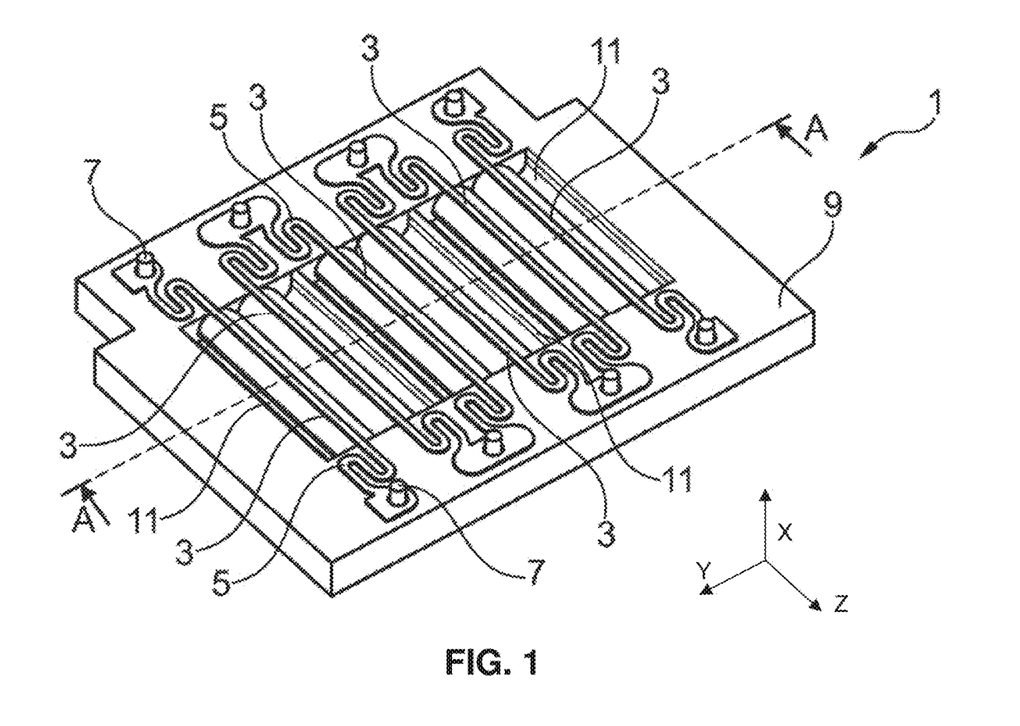
FIG. 1 Schematic top view of an initial embodiment of a precipitation device according to the invention.

FIG. 1 illustrates a schematic top view of a precipitation device 1 according to the invention. FIG. 1 illustrates the top view of the outlet side of the precipitation device 1. The precipitation device 1 includes a number of several guiding elements 3. More precisely, the precipitation device comprises six functional, i.e. guiding elements 3 mounted in parallel relative to the gas stream (F, F', GS, GS').

The guiding elements 3 are manufactured as punched sheet metal parts and equipped with resetting devices in the form of spring elements 5 produced as one piece. The spring elements 5 are fixed with the frame 9 of the precipitation device 1 at mounting points 7. The frame 9 particularly comprises an injection-molded plastic part.

The second guiding elements 11 are manufactured as one piece with the frame 9. The precipitation device 1 also comprises six second guiding elements 11.

FIG. 2 illustrates a cross section view of the precipitation device 1 shown in FIG. 1 along plane A. As can be particularly learned from FIG. 2, a gas stream GS enters the first guiding element 3 along a direction R1 and is divided into a first partial stream (first partial flow) GS1 and a second partial stream (second partial flow) GS2 by the central projection 20 that extends/projects in the negative X direction (i.e. direction R2). In this scenario, the guiding facility 13 is integrated on the rear side of the second guiding element 11. This guiding facility 13 causes the gas stream to generally enter the first guiding element tangentially to the first guiding surface 15 of the first guiding element. Moreover, the guiding surface 15 generally has a partly spherical design (e.g. forming a sectionally-spherical guiding surface) so that the gas stream is subjected to a change in direction, and particularly exits the first guiding element 3 in a direction R2. In the illustrated embodiment, the stream is deflected by 180°, i.e. a second direction R2 is opposingly parallel to the first direction R1. Because the first guiding element 3 is configured to deflect the gas stream, the first guiding element 3 may be referred to as a first deflector.

Due to the spherical design of the first guiding surface 15, a laminar flow guidance of the gas stream GS is achieved and at the same time a rotating or spinning motion is induced into the gas stream GS, which causes precipitation of oil drops and/or particles in a direction towards the guiding surface 15. The particles accumulating at the guiding surface 15 flow onto the paper plane shown in FIG. 2 and are discharged from the precipitation device through a drain that is not shown in the figures. As shown in FIG. 2, the first guiding surface 15 includes a flat surface section that transitions into corresponding spherical surface sections 15.1, 15.2 that are symmetrically arranged (with respect to a line of symmetry $L_s$) on opposite sides of the central projection 20. That is, the first spherical surface section 15.1 and the second spherical surface section 15.2 are symmetrically arranged with respect to the line of symmetry $L_s$ and the central projection 20, where the central projection extends along (e.g. in parallel with) the line of symmetry $L_s$. The entering gas stream GS is divided into a first partial stream (first partial flow) GS1 and a second partial stream (second partial flow) GS2 by the central projection 20 so that the first partial stream GS1 engages the first spherical surface section and the second partial stream GS2 engages the second spherical surface section 15.2.

As can be further seen from FIG. 1, the second guiding element 11 partly extends into the first guiding element 3.

The second guiding element 11 comprises a guiding surface 17. As can be particularly seen in FIG. 2, the second guiding surface 17 has a larger radius rad2 than the radius rad1 of the first guiding surface 15. In this way, the next deflection of the fluid stream takes place from a second direction R2 into a third direction R3. Because the second guiding element 11 is configured to deflect the gas stream GS to cause the change in direction of the gas stream GS, the second guiding element 11 may also be referred to as a second deflector.

Since the deflection in the second guiding element 11 is also approximately 180°, the third direction R3 runs approximately parallel and with the same orientation as the first direction R1. Subsequently, the gas stream exits the precipitation device 1.

As can be further learned from FIG. 2, this embodiment ensures labyrinthian or meandering deflection of the gas stream along plane E.

In plane E, the support frame is located on the one hand, and on the other hand, plane E is oriented perpendicular to the first direction R1. In non-illustrated embodiments it may be provided that the second guiding element is followed by a further third guiding element, particularly a number of several third guiding elements, along the flow of the gas stream. In this way, additional multiple deflection of the gas stream may be established so that the degree of precipitation is further increased.

Figure 3:
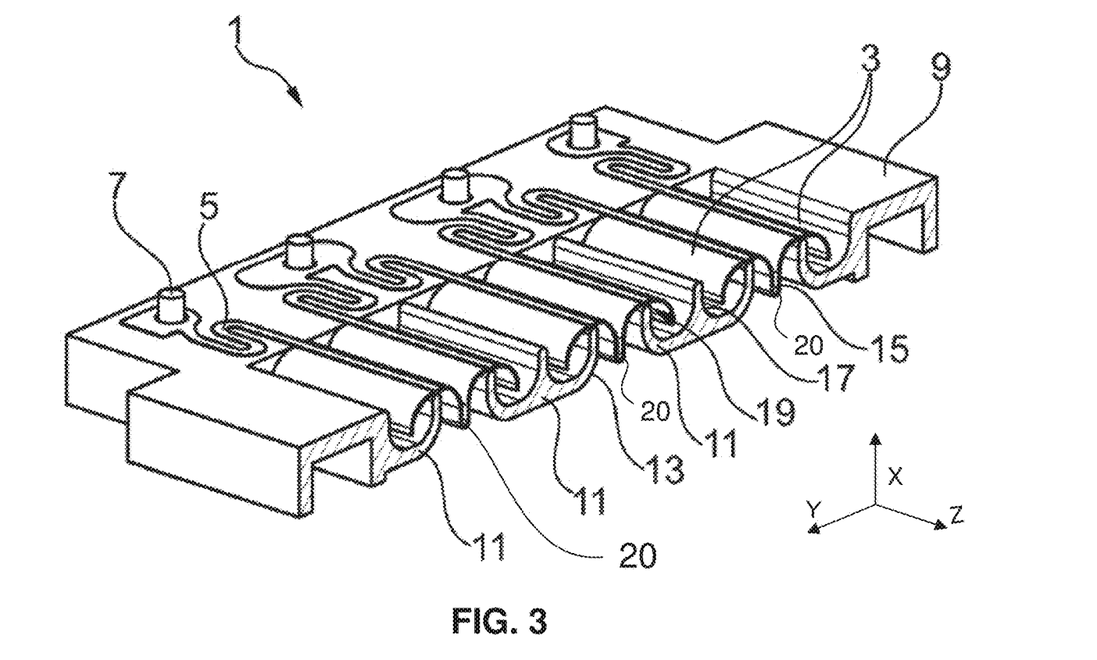
FIG. 3 Schematic cross section view of the precipitation device as illustrated in FIGS. 1 and 2, as seen from direction A of FIG. 1.

The embodiment further comprises several parallel first and second guiding elements 3, 11, as can be learned from the FIGS. 1 to 3. In this way, the entering gas stream GS is divided into a large number of partial streams (GS1 and GS2) by the central projection 20, that are each deflected by a first separation element 3, a second separation element 11, and an optional third separation element, connected in series, in such a way that rotational or spinning motion is induced into these labyrinthine or meandering (as described above) streams so that the appropriate particles are precipitated due to centrifugal forces.

With the embodiment illustrated in FIGS. 1 to 3, the first separating element 3 is movable relative to the second separating element 11 and/or the support frame 9. In the case that the fluid pressure or the fluid stream is increased, the first separating element 3 in FIG. 2 moves in direction X, i.e. along a normal direction of plane E. In this scenario, it is preferred, however, that a minimum gap between the first guiding element 3 and the second guiding element 11 is maintained, i.e. a minimum gap 19 between the first guiding element 3 and the second guiding element 11 is not undershot.

As can be further seen in FIGS. 1 to 3, it is particularly preferred that several first and second guiding elements 3, 11 are manufactured as single pieces, at least in parts. In other words, this ensures that a first part GS1 of the gas stream GS is guided in a first direction of plane E and a second part GS2 of the fluid gas stream GS is guided in an opposite direction within plane E in a labyrinthian or meandering fashion.

Figure 4:
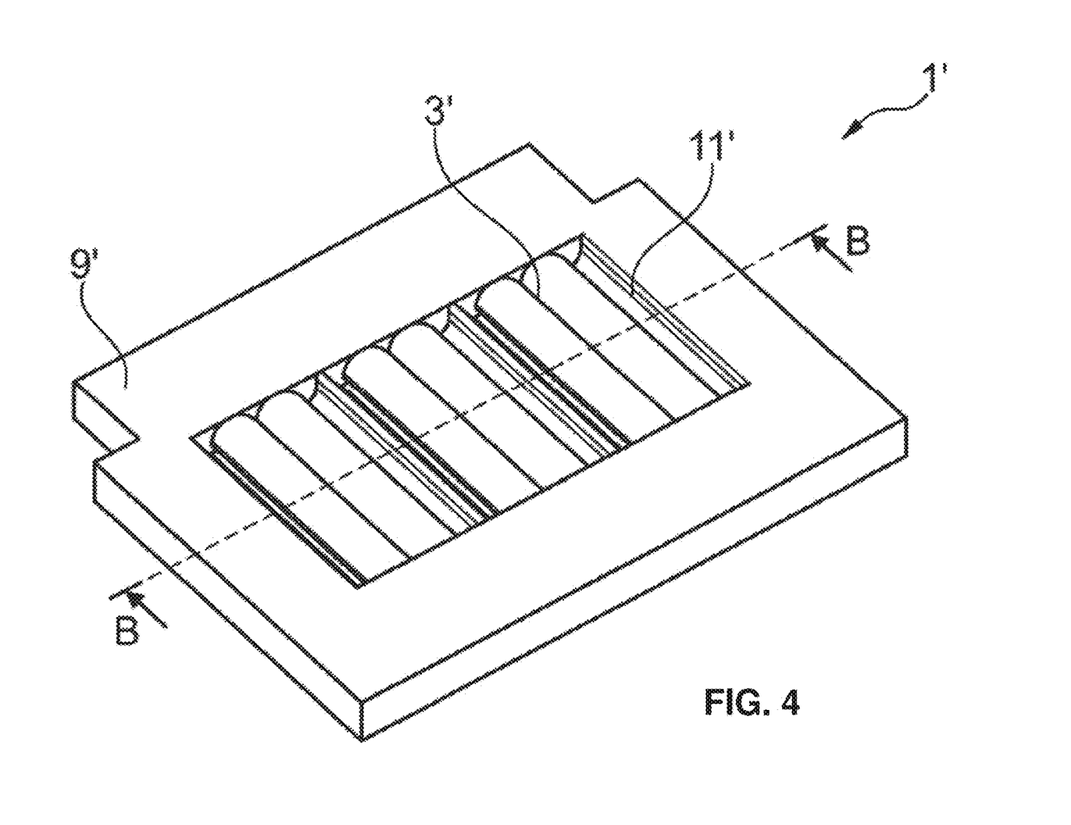
FIG. 4 Perspective top view of a precipitation device according to a second embodiment.
Figure 5:
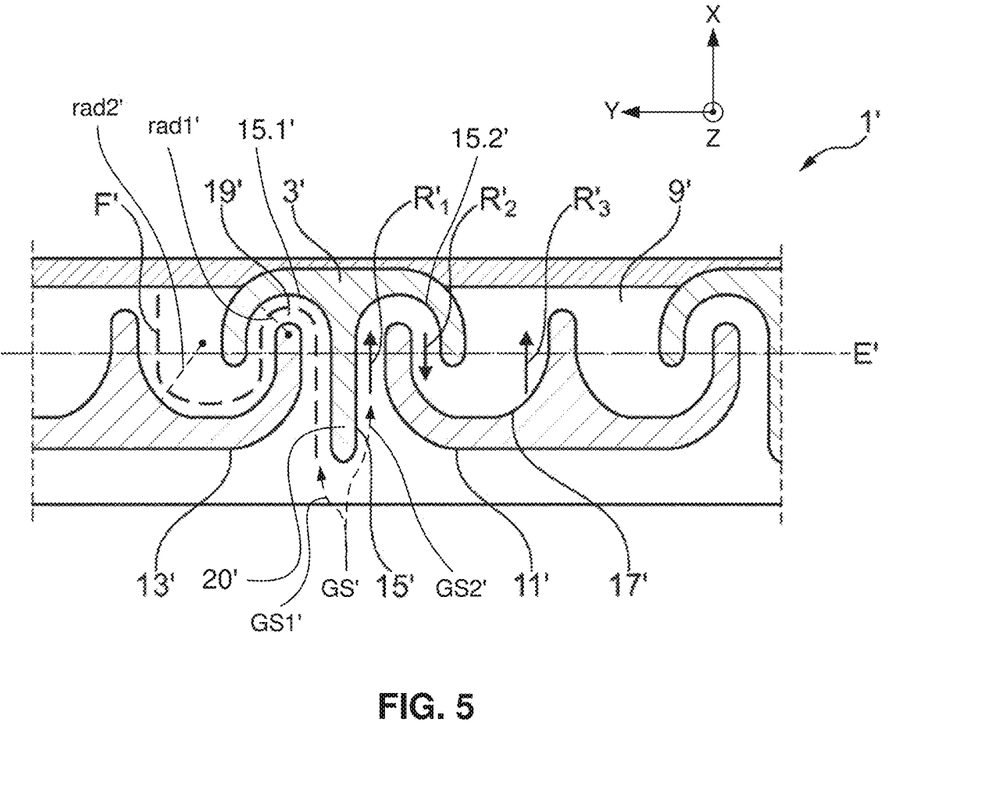
FIG. 5 A cross section view of the precipitation device as illustrated in FIG. 4, as seen from direction B of FIG. 4.

A second embodiment of a precipitation device 1' according to the invention is illustrated by FIGS. 4 and 5. The elements of the precipitation device 1', that correspond to those of the precipitation device 1, have the same reference number, yet with the notation '.

In contrast to the first embodiment, the precipitation device 1' comprises a first guiding element 3', which is manufactured as a single piece together with the frame 9'. Consequently, both the first guiding element 3' and the second guiding element 11' are manufactured as one piece together with the frame 9'. Thus, this embodiment particularly is not equipped with a spring element 5. In this way, an even simpler design of the precipitation device is achieved, which results in significant reduction of cost. Also, this simpler constructional design results in the precipitation being less prone to error and malfunction.

The characteristics specified in the description above, in the claims and in the figures, may be critical for the invention in its various embodiments, both individually and in combination.

REFERENCE NUMERAL 1, 1' Precipitation device
3, 3' Guiding element
5 Spring element
7 Mounting point
9, 9' Frame
11, 11' Guiding element
13, 13' Guiding facility
15, 15' Guiding surface
15.1, 15.2 spherical surface sections of the guiding surface 15, 15'
17, 17' Guiding surface
19, 19' Gap
20 central projection
A,B Direction
F, F', GS, GS' Fluid/gas stream
GS1, GS2 partial stream of the gas stream GS
rad1, rad2 radius
R1, R1' Direction
R2, R2' Direction
R3, R3 Direction
E, E' Plane
$L_s$ line of symmetry
X Direction
Y Direction
Z Direction

The invention claimed is:

1. A precipitation device for precipitation of fluid impurities from a blow-by gas stream, the precipitation device comprising:
 a first guiding element configured to cause a first change in direction of the stream, the first guiding element having first and second sectionally-spherical guiding surfaces symmetrically arranged with respect to a central projection extending along a line of symmetry of the symmetric arrangement of the first and second sectionally-spherical guiding surfaces, the central projection being configured to divide the stream into respective first and second partial flows, wherein the first and second sectionally-spherical guiding surfaces are configured to respectively guide the first and second partial flows to cause the first change in direction to each of the first and second partial flows;
 a second guiding element configured to cause a second change in direction of the first and second partial flows of the stream, the first guiding element being further configured to move away from the second guiding element in a first direction parallel to the line of symmetry, the movement of the first guiding element increasing a gap between the first guiding element and the second guiding element, the gap being in the first direction;
 a support frame configured to indirectly support the second guiding element and indirectly support the first guiding element; and
 a resetting device configured to cause the first guiding element to move towards the second guiding element in a second direction opposite the first direction and parallel to the line of symmetry to decrease the gap between the first guiding element and the second guiding element.

2. The precipitation device of claim 1, wherein the resetting device is configured to generate a restoring force to cause the first guiding element to move in the second direction towards the second guiding element.

3. The precipitation device of claim 2, wherein the resetting device comprises a leaf spring, a helical spring or elastomer spring.

4. The precipitation device of claim 1, further comprising: a gap between the first guiding element and the second guiding element, wherein the cross section of the flow comprises the gap and the moving of the first element changes a radius of the gap.

5. The precipitation device of claim 1, wherein the first change in direction is a direction opposite of a direction of the stream before approaching the first guiding element.

6. The precipitation device of claim 5, wherein the second change in direction is a direction opposite of a direction of the stream before approaching the second guiding element.

7. The precipitation device of claim 1, wherein: the support frame is integrated with the second guiding element as a single piece, and the resetting device is integrated into the first guiding element as an additional single piece.

8. The precipitation device of claim 7, wherein the single piece of the support frame and the second guiding element together comprises an injection molded plastic.

9. The precipitation device of claim 1, wherein:
 the first guiding element comprises a first radius configured to cause the first change in direction of the stream; and
 the second guiding element comprises a second radius configured to cause the second change in direction of the stream.

10. The precipitation device of claim 9, wherein the second radius is larger than the first radius.

11. The precipitation device of claim 9, wherein a center of the second radius is laterally offset from a center of the first radius in a third direction that is perpendicular to the first and second directions.

12. The precipitation device of claim 1, wherein the first guiding element is configured to move in the first direction based on a force of the stream acting on the first guiding element.

13. The precipitation device of claim 1, wherein the central projection extends from between the first and second sectionally-spherical guiding surfaces in the second direction.

14. A precipitation device for precipitation of impurities from a blow-by gas stream, the precipitation device comprising:
 at least one first guiding element configured to cause a first change in direction of the stream opposite of a direction of the stream before approaching the at least one first guiding element, the at least one first guiding element having first and second sectionally-spherical guiding surfaces symmetrically arranged with respect to a central projection extending along a line of symmetry of the symmetric arrangement the first and second sectionally-spherical guiding surfaces, the central projection being configured to divide the stream into respective first and second partial flows, wherein the first and second sectionally-spherical guiding surfaces are configured to respectively guide the first and second partial flows to cause the first change in direction to each of the first and second partial flows;

at least one second guiding element configured to cause a second change in direction of the first and second partial flows of the stream opposite of a direction of the first and second partial flows of the stream before approaching the at least one second guiding element;

at least one support frame indirectly supporting the at least one first guiding element and indirectly supporting the at least one second guiding element, wherein the at least one support frame is integrated into the at least one second guiding element as a single piece; and a resetting device that is configured to generate a restoring force that moves the at least one first guiding element relative to the support frame in a direction parallel to the line of symmetry to decrease a gap between the at least one first guiding element and the at least one second guiding element, wherein the resetting device is integrated into the at least one first guiding element as a single piece.

15. The device of claim 14, wherein the single piece of the at least one support frame integrated into the at least one second guiding element comprises an injection molded plastic.

16. A device for precipitation of fluid impurities from a blow-by gas stream, the precipitation device comprising:

at least one first deflector configured to cause a first change in direction of the stream opposite of a direction of the stream before approaching the at least one first deflector, the at least one first deflector having first and second sectionally-spherical guiding surfaces symmetrically arranged with respect to a central projection extending along a line of symmetry of the symmetric arrangement of the first and second sectionally-spherical guiding surfaces, the central projection being configured to divide the stream into respective first and second partial flows, wherein the first and second sectionally-spherical guiding surfaces are configured to respectively guide the first and second partial flows to cause the first change in direction to each of the first and second partial flows;

at least one second deflector configured to cause a second change in direction of the first and second partial flows of the stream opposite of a direction of the first and second partial flows of the stream before approaching the at least one second deflector, the at least one first deflector being further configured to move away from the at least one second deflector in a first direction parallel to the line of symmetry in response to a pressure of the stream acting on the at least one first deflector at least partially in the first direction, the movement of the at least one first deflector increasing a gap between the at least one first deflector and the at least one second deflector, the gap being in the first direction;

at least one support frame indirectly supporting the at least one first deflector and indirectly supporting the at least one second deflector; and a resetting device that is configured to generate a restoring force to cause movement of the at least one first deflector relative to the support frame, in a second direction parallel to the line of symmetry and opposite the first direction, to decrease the gap between the at least one first deflector and the at least one second deflector.

17. The device of claim 16, wherein a cross section of the flow comprises the gap and the moving changes a radius of the gap.

18. The device of claim 17, wherein the resetting device comprises a leaf spring, a helical spring or elastomer spring.

19. The device of claim 16, wherein: the at least one support frame is integrated into the at least one second deflector as a single piece, and the resetting device is integrated into the at least one first deflector as an additional single piece.

20. The device of claim 19, wherein the single piece of the at least one support frame and the at least one second deflector together comprises an injection molded plastic.

* * * * *